(12) United States Patent
Lee

(10) Patent No.: US 8,137,748 B2
(45) Date of Patent: Mar. 20, 2012

(54) FIBER INCLUDING SILICA AND METAL OXIDE

(75) Inventor: Kwangyeol Lee, Gyeongkido (KR)

(73) Assignee: Korea University Research and Business Foundation, Seoul (KR)

( * ) Notice: Subject to any disclaimer, the term of this patent is extended or adjusted under 35 U.S.C. 154(b) by 740 days.

(21) Appl. No.: 12/199,748

(22) Filed: Aug. 27, 2008

(65) Prior Publication Data

US 2010/0055002 A1    Mar. 4, 2010

(51) Int. Cl.
*B05D 3/02* (2006.01)
(52) U.S. Cl. .................................................. 427/227
(58) Field of Classification Search .............. 427/227
See application file for complete search history.

(56) References Cited

U.S. PATENT DOCUMENTS

| | | | | |
|---|---|---|---|---|
| 4,226,821 A | * | 10/1980 | Ishikawa et al. | 264/134 |
| 4,770,935 A | * | 9/1988 | Yamamura et al. | 428/366 |
| 5,478,531 A | * | 12/1995 | Yoshikawa | 422/171 |

OTHER PUBLICATIONS

Ishikawa, "Photocatalytic Fiber with Graident Surface Structure Produced from a Polycarbosilane and its Applications," Int. J. Appl. Ceram. Tech. 1, pp. 49-55 (2004).*
Lin et al. 2002, Structural and morphological control of cationic surfactant-templated mesoporous silica, *Accounts of Chemical Research* 35(11):927-935.
Takeda et al. 1999, Properties of polycarbosilane-derived silicon carbide fibers with various C/Si compositions, *Composites Science and Technology* 59:787-792.
Ryoo et al. 1997, Optically transparent, single-crystal-like oriented mesoporous silica films and plates, *J. Phys. Chem. B* 101(50):10610-10613.
Kim et al. 2004, Preparation of polycarbosilane using a catalytic process, *Advances in Technology of Materials and Materials Processing* 6(2):192-195.

* cited by examiner

*Primary Examiner* — James Lin
*Assistant Examiner* — Robert Vetere
(74) *Attorney, Agent, or Firm* — Knobbe, Martens, Olson & Bear, LLP

(57) ABSTRACT

Techniques for coating a fiber with metal oxide include forming silica in the fiber to fix the metal oxide to the fiber. The coated fiber can be used to facilitate photocatalysis.

27 Claims, 2 Drawing Sheets

FIBER INCLUDING SILICA AND METAL OXIDE

BACKGROUND

It is known that metal oxide such as titanium oxide may be used as photocatalyst by absorbing light energy. Using such effect, there have been attempts to remove environmental pollution such as the sources of air pollution and water pollution. In the past, it was general to use metal oxide by fixing it in a carrier such as metal, ceramic and activated carbon. However, in the case of fixing a photocatalyst on a surface, the photocatalyst can detach from the carrier. Also, it is not easy to change photocatalyst according to the shape of a reactor because the photocatalyst is fixed. In the case of using photocatalyst in a fixed carrier, it is not easy to replace photocatalyst whose activity is lowered because of aging and repetitive uses.

DETAILED DESCRIPTION

Figure 1:
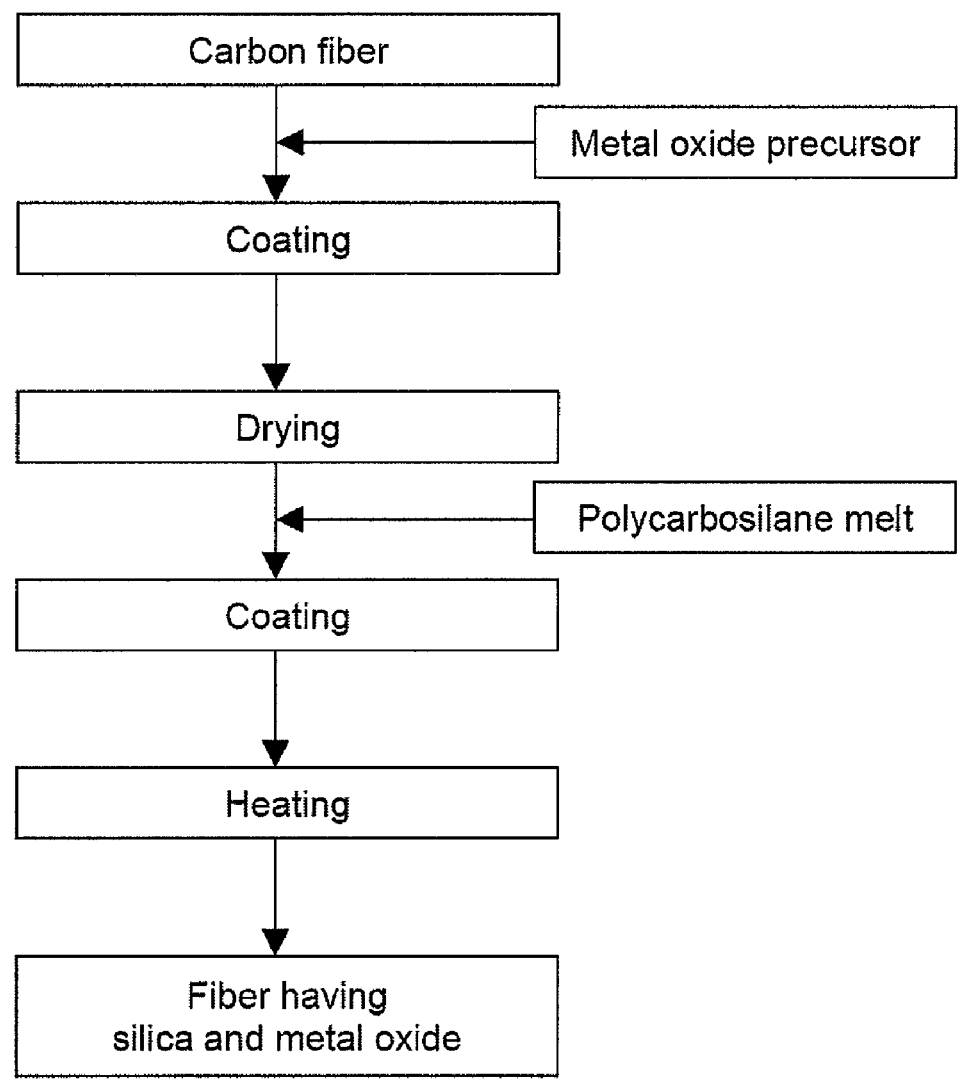
FIG. 1 is a flow chart of an illustrative embodiment of a method for preparing a fiber.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, may be arranged, substituted, combined, and designed in a wide variety of different configurations, all of which are explicitly contemplated and make part of this disclosure.

In one embodiment, a method for preparing a fiber may include providing a solution containing at least one metal oxide precursor and/or at least one metal oxide to a carbon fiber, drying the carbon fiber to immobilize the metal oxide precursor and/or the metal oxide on a surface of the carbon fiber, providing a polycarbosilane melt to the carbon fiber, and heating the carbon fiber to obtain a fiber including silica and metal oxide. One such embodiment is shown in FIG. 1.

In another embodiment, a fiber may include silica and metal oxide, where the fiber include a silica phase formed in a core of the fiber, and where the fiber includes a metal oxide phase formed on a surface of the fiber.

In yet another embodiment, an apparatus may include at least one fabric pad prepared from a fiber including silica and metal oxide, where the fiber includes a silica phase formed in a core of the fiber, and where the fiber include a metal oxide phase formed on a surface of the fiber, and at least one device for fixing the fabric pad.

A Method for Preparing a Fiber

In order to prepare a fiber including silica and metal oxide, a solution containing at least one metal oxide precursor and/or at least one metal oxide may be provided to a carbon fiber. A variety of suitable methods may be employed for providing a solution to the carbon fiber. In some embodiments, a solution may be coated on a surface of the carbon fiber using methods such as dip coating, spray coating and the like.

In one embodiment, a carbon fiber may include only carbon atoms. A carbon fiber may be prepared by pyrolyzing a fiber spun out of an organic precursor in the form of a fiber, under inert conditions. In one embodiment, the heating of the pyrolyzing process is carried out at a temperature of about 1000° C. to about 3000° C. A carbon fiber may include carbon of at a purity of about 92% to about 99.99%.

A carbon fiber may be classified into a cellulose carbon fiber (rayon carbon fiber), an acrylonitrile carbon fiber, a phenol carbon fiber, a pitch carbon fiber, a polyvinylalcohol carbon fiber and the like, according to a type of an organic precursor.

In one embodiment, a carbon fiber may be prepared from an appropriate organic precursor using standard methods. A structure of a carbon fiber may vary depending on a type of a precursor used, a method of heating the precursor, a temperature of the heating, and whether drawing is performed or not when heating. One skilled in the art may obtain a carbon fiber with desirable structure by properly modifying such conditions.

In one embodiment, an average diameter of the carbon fibers ranges from about 1 mm or less. In other embodiments, the carbon fiber diameter ranges from about 500 µm or less. In still other embodiments, the carbon fiber diameter ranges from about 100 µm or less. In yet other embodiments, the carbon fiber diameter ranges from about 50 µm or less, or even about 1 µm or less in still further embodiments. Further, in some embodiments a specific surface area of a carbon fiber may range from about 200 $m^2/g$ to about 3000 $m^2/g$. In other embodiments the carbon fiber may have different specific surface area.

A carbon fiber may be in the form of one-dimensional filament or yarn. A carbon fiber may be manufactured in a desirable form. For example, in some embodiments, carbon fiber may be in the form of a fiber bundle, bulky fiber, woven fabric, non-woven fabric, braided fabric, paper, felt and the like.

In one embodiment, a variety of suitable metal oxide precursors capable of providing metal oxide having desirable properties may be used. For example, a metal oxide precursor may include at least one metal element such as Ti, Zn, Al, Y, Li, B, Na, Ba, Ca, V, Cr, Mn, Fe, Co, Ni, Cu, Zn, Zr, Nb, Mo, Ru, Rh, Pd, Ag, W, Pt, Au, Ce or any combination thereof, accordingly, claimed subject matter is not limited in this regard. A metal oxide precursor may be provided in the form of metal alkoxide, metal halide or metal salt; however, claimed subject matter is not limited in this regard. The metal oxide precursor may provide metal oxide by oxidization.

In other embodiments, at least one titanium oxide precursor may be used. Examples of titanium oxide precursor may include titanium alkoxide, titanium halide, titanium salt and the like however, claimed subject matter is not limited in this regard. Examples of titanium alkoxide may include titanium tetra-methoxide, titanium tetra-ethoxide, titanium tetra-isopropoxide, titanium tetra-butoxide, titanium monomethoxy-triisopropoxide, titanium dimethoxy-diisopropoxide and the like. Examples of titanium halide may include titanium tetra-fluoride, titanium tetra-chloride, titanium tetra-bromide, titanium tetra-iodide and the like. Examples of titanium salt may include $Ti(ClO)_2$, $Ti(ClO)_3$, $Ti(ClO)_4$, $Ti(ClO_2)_2$, $Ti(ClO_2)_3$, $Ti(ClO_2)_4$, $Ti(ClO_3)_2$, $Ti(ClO_3)_3$, $Ti(ClO_3)_4$, $Ti(ClO_4)_2$, $Ti(ClO_4)_3$, $Ti(ClO_4)_4$, $Ti(CO_3)_2$, $Ti(HCO_3)_2$, $Ti(HCO_3)_3$, $Ti(HCO_3)_4$, $Ti(HPO_4)_2$, $Ti(NO_2)_2$, $Ti(NO_2)_3$, $Ti(NO_2)_4$, $Ti(NO_3)_2$, $Ti(NO_3)_3$, $Ti(NO_3)_4$, $Ti(SO_3)_2$, $Ti(SO_4)_2$, $Ti_2(CO_3)_3$, $Ti_2(HPO_4)_3$, $Ti_2(SO_3)_3$, $Ti_2(SO_4)_3$, $Ti_3(PO_4)_2$, $Ti_3(PO_4)_4$, $TiCO_3$, $TiHPO_4$, $TiPO_4$, $TiSO_3$, $TiSO_4$ and the like.

An amount of metal oxide formed on a surface of a prepared fiber may vary depending on the concentration of at least one metal oxide precursor and/or at least one metal oxide in a solution. In addition, the amount of metal oxide may be further varied by repeating the number of coatings, etc. In one embodiment, an amount of metal oxide in a solution may be about 0.1 M to about 1 M. In other embodiments, different concentrations of metal oxide in the solution may be used.

In one embodiment, at least one metal oxide precursor and/or at least one metal oxide may be dissolved in a variety of suitable organic solvents. For example, the solvent may be water, alcohol (for example, methanol, ethanol, propanol, butanol, pentanol and combinations thereof), or any combination thereof.

In one embodiment, a surface of a carbon fiber is coated with a solution containing at least one metal oxide (for example, titanium oxide). In such embodiment, a crystalline of a metal oxide phase coated on a surface of the fiber may be improved, since a metal oxide having a pre-determined crystalline is used.

In one embodiment the metal oxide solution includes only one metal element. In other embodiments, metal oxide solution may include two or more metal elements. In some embodiments of the multi-metal solution, various ratios of each metal oxide may be employed. For example, two or more metal elements may be used in a same amount by mole, or, in other embodiments, one of metal elements may have a higher concentration than that of the other metal elements. In one such embodiment, the concentration may be differentiated by doping the main metal oxide phase on the surface of the fiber.

In one embodiment, a carbon fiber is coated with a solution containing at least one metal oxide precursor and/or at least one metal oxide. The coated carbon fiber may then be dried. In some embodiments, the carbon fiber may be dried using standard methods of drying such as, for example, with unheated air (or other gas or gases), heated air or gas, sunlight, infrared light and the like. Drying may be carried out at a temperature of about 0° C. to about 150° C., in one embodiment. In other embodiments, the drying may be carried out at room temperature to about 150° C. Through the drying process, a solvent may be evaporated and at least one metal oxide precursor and/or at least one metal oxide may be fixed on the surface of a carbon fiber. In another embodiment an additional surfactant is used as described below. A surface of a carbon fiber is coated with a solution containing at least one metal oxide precursor and/or at least one metal oxide and the additional surfactant. In one embodiment, at least a part of the surfactant may be evaporated by the drying process.

In one embodiment, polycarbosilane melt may be provided to a carbon fiber where at least one metal oxide precursor and/or at least one metal oxide are/is provided. Polycarbosilane may be prepared by a variety of common methods.

In one embodiment, examples of polycarbosilane may include a polycarbosilane having a main chain of the following formula:

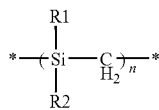

where R1, R2 may include, independently of one another, H, hydroxy, $C_1$-$C_4$ alkyl, $C_1$-$C_4$ alkoxy or phenyl; and n may be an integer between 1 and 30.

In one embodiment, a softening temperature of polycarbosilane may be above room temperature; for example from about 50° C. to about 300° C. In view of processability, the softening temperature may within the above range. In some embodiments, a molecular weight of the polycarbosilane may range from about 100 to about 50000. In other embodiments, the molecular weight of the polycarbosilane may range from about 200 to about 30000. In yet other embodiments, the molecular weight of the polycarbosilane may range from about 200 to about 20000, or may even range from about 1000 to about 10000 in still other embodiments.

In one embodiment, a polycarbosilane melt may be formed by heating at a temperature above a softening point. The melt may be coated on the surface of a carbon fiber by a variety of common methods such as, for example, dip coating, spray coating, and the like. A carbon fiber whereon polycarbosilane is coated may be obtained by coating a surface of a carbon fiber with polycarbosilane melt, and cooling it below the polycarbosilane's softening temperature.

In one embodiment, a fiber including metal oxide may be obtained by heating a carbon fiber whereon metal oxide precursor and/or metal oxide, polycarbosilane and the like are coated. The heating may be carried out in air or other gas or gases, including oxygen gas or combinations thereof. The heating may be carried out at a temperature ranging from about 300° C. to about 1500'.

In one embodiment, carbon in a carbon fiber may be oxidized and eliminated from the fiber in the form of carbon dioxide by heating. A metal oxide precursor may be oxidized to form metal oxide on a surface of the fiber. Polycarbosilane may move to inside of the fiber and space between metal oxides (or metal oxide precursors) during heating. Polycarbosilane may be oxidized, to form silica (silicon dioxide).

In one embodiment, a fiber prepared by heating may include silica and metal oxide. The fiber may include a silica phase formed in a core of the fiber, and a metal oxide phase formed on a surface of the fiber. In some embodiments, the fiber may include oxide of metal such as Ti, Zn, Al, Y, Li, B, Na, Ba, Ca, V, Cr, Mn, Fe, Co, Ni, Cu, Zn, Zr, Nb, Mo, Ru, Rh, Pd, Ag, W, Pt, Au, Ce or any combination thereof.

In one embodiment, titanium oxide may be formed on a surface of a fiber by using a titanium oxide precursor as a metal oxide precursor.

In one embodiment, titanium oxide may be used as photocatalyst decompose organic materials (e.g., see *Nature*, vol. 238 (1972), 37-38) by exposing titanium oxide to light. Thus, titanium oxide embodiments may be used to decompose source materials of air pollution, water pollution and the like.

In some embodiments, titanium oxide on the fibers may include at least some portions having a crystalline structure such as anatase-type, rutile-type, brookite-type and the like. In some embodiments, titanium oxide of the anatase-type may be used to facilitate the photocatalytic effect.

In one embodiment, titanium oxide may be used as a photocatalyst by illuminating the titanium oxide with ultraviolet light (e.g., the UV light may have wavelength(s) of about 400 nm or less). In other embodiments, a metal oxide precursor other than a titanium oxide precursor may be used to form metal oxide on the surface of a fiber to activate photocatalytic action absorbing visible light. These other metal oxide precursors may form undoped metal oxide in some embodiments. In other embodiments, metal oxide precursors that form doped metal oxide may be used.

In some embodiments, in addition to titanium oxide, metal oxide capable of effecting photocatalytic activity by itself (for example, $V_2O_3$, ZnO, $ZrO_2$, SnO, WO, $Fe_2O_3$, etc.) may be formed on a surface of a fiber. Photocatalytic effect may be increased by combining at least one metal oxide (other than titanium oxide) having photocatalytic activity with titanium oxide.

In one embodiment, a diameter of the fiber may be about 1 mm or less. In other embodiments, the fiber diameter may be about 100 μm or less. In yet other embodiments, the fiber diameter may be about 10 μm or less, or even about 1 μm or less in still other embodiments. In some embodiments, a thickness of the fiber (which may include coatings of silica and/or metal oxide) may be adjusted by adjusting by controlling a variety of features. For example, the thickness may be adjusted by controlling a thickness of a carbon fiber, an amount and type of polycarbosilane and/or metal oxide precursor, the repeating number of coating, a method and condition of heating and so on.

In one embodiment, metal oxide may be chemically intimately bonded to a support (i.e., a silica phase) in the fiber. For example, the fiber may be prepared as described above where metal oxide is formed on a surface of a silica phase. Thus, the fiber may reduce detachment of metal oxide particles from a support, compared to a fiber prepared by conventional methods (e.g., where metal oxide in the form of powder is coated on a surface of a support such as silica, metal and the like, or metal oxide is coated on a surface of a support by sol-gel method). In addition, a silica phase may be transparent, and thus photocatalyst may be increased by allowing the light to reach the metal oxide. For example, where titanium oxide formed on a surface of a support made from UV-transparent silica can improve the photocatalyst effect of the titanium oxide.

In one embodiment, a solution containing at least one metal oxide precursor and/or at least one metal oxide may further contain a surfactant. Various surfactants may be employed in various embodiments. Examples of surfactants may include nonionic or cationic surfactants as described below.

In some embodiments, nonionic surfactants may include polyoxyethylene-type nonionic surfactant, polyglycerin-type nonionic surfactant, sugar ester-type nonionic surfactant and the like. In other embodiments, nonionic surfactants may be used alone or in mixtures with other surfactants.

In some embodiments, polyoxyethylene-type nonionic surfactant may include polyoxyethylene alkylether, polyoxyethylene alkylphenylether, polyoxyethylene polyoxypropylene alkylether, polyoxyethylene fatty acid ester, polyoxyethylene sorbitan fatty acid ester, polyoxyethylene glycerin fatty acid ester, derivatives of polyoxyethylene castor oil or hard castor oil, derivatives of polyoxyethylene wax-lanolin, alkanol amide, polyoxyethylene propylene glycol fatty acid ester, polyoxyethylene alkylamine, polyoxyethylene fatty acid amide, sugar fatty acid ester, polyglycerin fatty acid ester, polyether modified silicon and the like. In some embodiments, polyoxyethylene-type nonionic surfactants may include polyoxyethylene cholesterolether, polyoxyethylene phytosterolether. Such nonionic surfactants may be used alone or in mixtures with other surfactants.

In embodiments, the alkyl group in polyoxyethylene non-ionic surfactants may be an alkyl group of saturated or unsaturated fatty acid having $C_6$~$C_{22}$. For example, the alkyl group may be a fatty acid of a single composition such as lauric acid, myristic acid, stearic acid, oleic acid, etc. In addition, the alkyl group may be a mixed fatty acid such as coconut fatty acid, tallow fatty acid, hydrogenated tallow fatty acid, castor oil fatty acid, olive oil fatty acid, palm oil fatty acid, etc., or synthesized fatty acid (including branched fatty acid). In some embodiments, polyoxyethylene non-ionic surfactant may be, for example, $C_{12}H_{25}(CH_2CH_2O)_{10}OH$ known as $C_{12}EO_{10}$ or 10 lauryl ether; $C_{16}H_{33}(CH_2CH_2O)_{10}OH$ known as $C_{16}EO_{10}$ or 10 cetyl ether; $C_{18}H_{37}(CH_2CH_2O)_{10}OH$ known as $C_{18}EO_{10}$ or 10 stearyl ether; $C_{12}H_{25}(CH_2CH_2O)_4OH$ known as $C_{12}EO_4$ or 4 lauryl ether; $C_{16}H_{33}(CH_2CH_2O)_2OH$ known as $C_{16}EO_2$ or 2 cetyl ether; or combinations thereof. In some other embodiments, polyoxyethylene(5) nonylphenyl ether (Product Name: Ige pal CO-520) may be used.

In another embodiment, fluoroalkyl groups substituting hydrogen with any number of fluorine may be used as an alkyl group. In a polyoxyethylene non-ionic surfactant, the number of condensations of polyoxyethylene may be within the range of 1~50.

In one embodiment, nonionic surfactants may include ethylene oxide/propylene oxide block copolymer.

Examples of block copolymer may include two-block compound such as poly(ethylene oxide)-b-poly(propyleneoxide), and three-block compound such as poly(ethylene oxide)-poly(propylene oxide)-polyethylene oxide or poly(propylene oxide)-poly(ethylene oxide)-poly(propylene oxide). Examples of block copolymer surfactants may include, for example, Pluronic® product name: P123 [poly(ethylene oxide)-b-poly(propylene oxide)-b-poly(ethylene oxide); $EO_{20}PO_{70}EO_{20}$], P103, 10R5, F98, 25R4, 17R4 that may be obtained from BASF Corporation.

In other embodiments, surfactants may include $C_{6-20}$ alkyl amine ($RNH_2$) surfactants, for example, oleylamine, octylamine, hexadecylamine, octadecylamine.

In other embodiments, various amounts of surfactants may be employed. An amount of surfactant may range from about 0.1 to about 10 part by weight based on a solvent of 100 part by weight in some embodiments. In other embodiments, the amount of surfactant may range from about 1 to about 5 part by weight based on a solvent of about 100 part by weight. In still other embodiments, the amount of surfactant may range from about 3 to about 5 part by weight based on a solvent of 100 part by weight.

In some embodiments, the surfactant may have a molar ratio of at least metal oxide precursor and/or at least metal oxide surfactants ranging from about 40:1 to about 80:1.

In some embodiments, a mesoporous metal oxide phase surfactant may be formed. In some embodiments, a size of metal oxide formed on a surface of a fiber may be uniform.

In one embodiment, a pore of the metal oxide phase may have a diameter ranging from about 50 nm or less. In other embodiments, a pore of the metal oxide phase may have a diameter ranging from about 1 nm to about 50 nm. In yet other embodiment, a pore of the metal oxide phase may have a diameter ranging from about 2 nm to about 50 nm. In yet other embodiments, the metal oxide has pores sized such that the metal oxide has an effective surface area ranging from about 200 $m^2$/g to about 3000 $m^2$/g.

In some embodiments, a fiber may be processed in the form of fiber bundles, bulky fibers, woven fabric, non-woven fabric, braided fabric, paper, felt and the like. In other embodiments, a fabric pad may be prepared from the fiber using common methods.

In one embodiment, when a fiber or a fabric pad includes metal oxide capable of photocatalytic activity, the fiber or the fabric pad may be used for decomposing organic materials that may cause air pollution and/or water pollution (e.g., livestock farming waste water, various endocrine disrupters, and the like). In another embodiment, the fiber or the fabric pad may be used as an electric wire. Such embodiments use properties of the metal oxide other than photocatalytic activity. In some embodiments, the fiber or fabric pad uses, for example, gas sensor, electron conductivity properties of the metal oxide.

An Apparatus Including a Fabric Pad

In some embodiments, an apparatus may include at least one fabric pad prepared from the fiber prepared as described above; and at least one device for fixing the fabric pad.

In one embodiment, a device for fixing the fabric pad may include a variety of shapes, such as propeller, plate, sheet, cylinder, and sphere. In other embodiments different shapes may be used. A fabric pad may be prepared in order to fit an external shape of a device for fixing the fabric pad.

Figure 2:
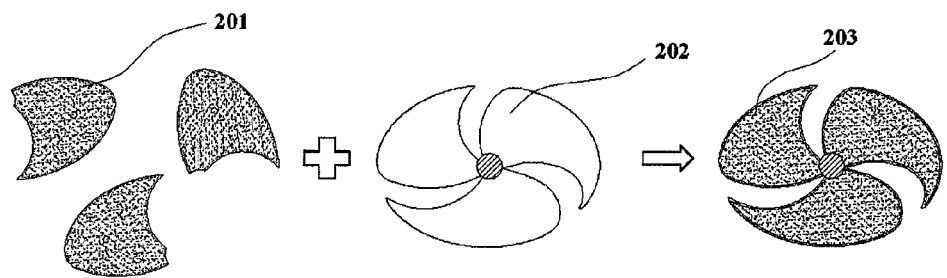
FIG. 2 is a schematic diagram of an illustrative embodiment of a device having a fabric pad.
Figure 3:
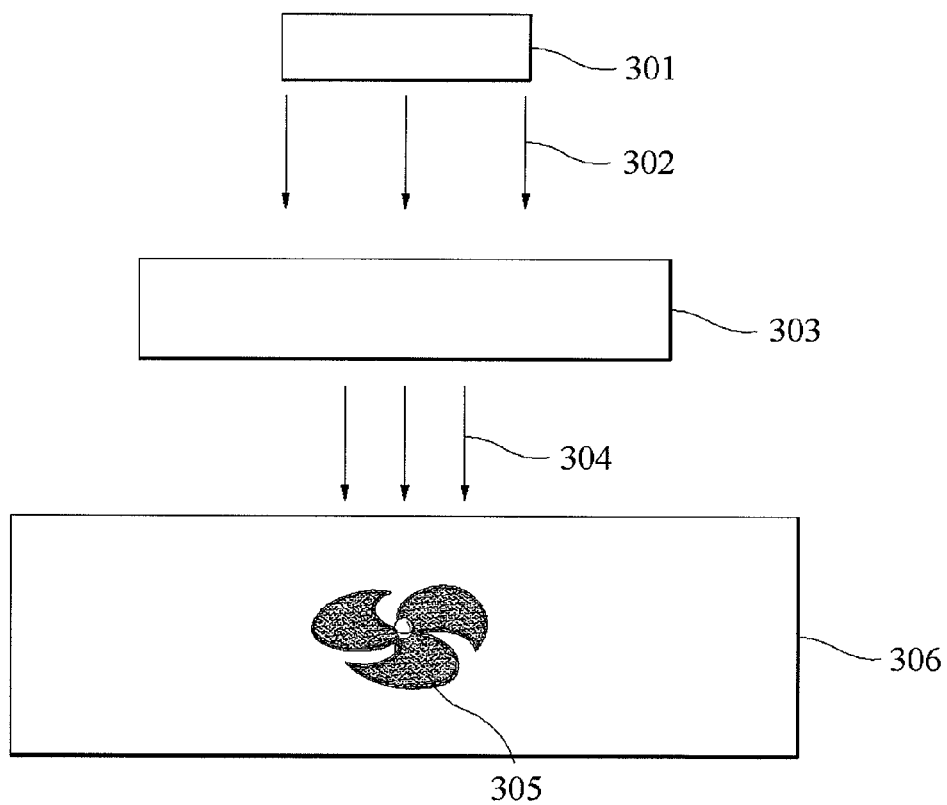
FIG. 3 is a schematic diagram of an illustrative embodiment of an apparatus using a fabric pad.

In an illustrative embodiment as shown in FIG. 2, a device for fixing the fabric pad may include a propeller 202. A fabric pad may be prepared in the shape of the wing of the propeller by processing the fiber as described above. Then, the fabric pad 201 may be fixed outside of the wing of propeller 202 to form a propeller having a fabric pad 203.

In one embodiment, a fabric pad may be fixed by simple operation such as fitting or tying the fabric pad to the outside of a fixed device, not by physically or chemically bonding the fabric pad to the outside of the fixed device. Thus, a fabric pad may be easily detached from and reattached to a fixed device. For example, an old fabric pad may be easily removed and replaced with a new one from a device for fixing the pad, when the catalytic activity of metal oxide included in a fiber of a fabric pad is decreased by aging and the like. Further, a fabric pad may be used without any limitation in the shape of a catalyst reactor, or material thereof, since the fabric pad may be manufactured in various shapes.

In some embodiments, an apparatus may optionally include at least one equipment where a device having a fabric pad is placed in the equipment. For example, an apparatus may include an equipment 306 where a propeller having a fabric pad 305 is placed in the equipment 306, as shown in FIG. 2. In FIG. 2, a propeller having a fabric pad 305 may be rotated to circulate air, water and the like in equipment 306. As the propeller is rotated, organic materials may contact a surface of the fabric pad. The speed of rotation may be adjusted to control the rate at which the organic materials contact the fabric. Examples of the equipment 306 may include a water reservoir, a water tank, a water bottle, a location around a source of air pollution and the like. In other embodiments, an apparatus including the equipment may include one or more devices having a fabric pad to increase photocatalytic activity.

In one embodiment, an apparatus may optionally include at least one source of light. For example, an apparatus may include a source of light 301 where light 302 may be emitted, as shown in FIG. 2. The light 302 emitted from the source of light 301 may illuminate a device having a fabric pad to decompose organic materials on a surface of metal oxide (such as titanium oxide) acting as photocatalyst. Examples of the source of light 301 may include an artificial source of light such as a fluorescent lamp, a glow lamp, an UV lamp, and the like), as well as a natural source of light such as the sun.

In one embodiment, an apparatus may optionally include at least one light-collecting device. For example, an apparatus may include a light-collecting device 303 where the light 302 from the source of light 301 may be collected to emit light 304. The light-collecting device may increase the photocatalytic effect of metal oxide by focusing the light 302 emitted from the source of light 301 to form collected light 304. Examples of the light-collecting device may include a lens, a mirror, a reflector and any combination thereof; however, claimed subject matter is not limited in this regard. In other embodiment, multiple light-collecting devices may be placed in series to concentrate more light.

Example 4.3 g of titanium isopropoxide and 3.12 g of HCl (35 wt %; for adjusting pH) may be mixed and stirred for 5 minutes at room temperature. Then, the stirred mixture may be added to a solution of 2 g of Pluronic® P123 in 12 g of 1-propanol. The mixed solution may be stirred for 10 minutes at room temperature. A woven carbon fiber whose specific surface area may be about 3000 $m^2/g$ and diameter may be about 1~5 µm, may be immersed in said solution and taken out, and the carbon fiber may be dried for one day at room temperature.

The carbon fiber whereon titanium butoxide may be coated, may be immersed in a melt where polycarbosilane powder (e.g., obtained from Nippon Carbon Co., Ltd.) may be heated and melted at a temperature of about 200° C. The Carbon fiber can be removed from the melt and dried at room temperature to form a polycarbosiline coated fiber.

Further, a fiber including silica and titanium oxide may be obtained by heating the carbon fiber at a temperature of about 900° C. under the atmosphere containing oxygen gas in a furnace.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method comprising:
  providing a solution containing at least one metal oxide precursor to a carbon fiber;
  drying the carbon fiber to fix the metal oxide precursor on a surface of the carbon fiber;
  providing a polycarbosilane melt to the carbon fiber; and
  heating the carbon fiber to obtain a fiber comprising silica and metal oxide, wherein the fiber comprises a silica phase formed in a core of the fiber, and a metal oxide phase formed on the surface of the fiber.

2. The method of claim 1, wherein the solution containing at least one metal oxide precursor further comprises at least one metal oxide.

3. The method of claim 1, wherein the metal oxide comprises titanium dioxide.

4. The method of claim 1, wherein the metal oxide precursor comprises at least one titanium oxide precursor.

5. The method of claim 1, wherein the metal oxide precursor comprises at least one titanium oxide precursor selected from the group consisting of titanium alkoxide, titanium halide and titanium salt.

6. The method of claim 1, wherein the metal oxide precursor comprises at least one metal element selected from the group consisting of Zn, Al, Y, Li, B, Na, Ba, Ca, V, Cr, Mn, Fe, Co, Ni, Cu, Zn, Zr, Nb, Mo, Ru, Rh, Pd, Ag, W, Pt, Au, Ce and any combination thereof.

7. The method of claim 1, wherein the solution further contains at least one non-ionic surfactant.

8. The method of claim 7, wherein the non-ionic surfactant comprises a surfactant selected from the group consisting of polyoxyethylene-type surfactant, polyglycerin-type surfactant, sugar ester-type surfactant, ethylene oxide/propylene oxide block copolymer and any combination thereof.

9. The method of claim 1, wherein the solution comprises at least one organic solvent selected from the group consisting of water, alcohol and any mixture thereof.

10. The method of claim 1, wherein drying comprises drying at a temperature of about 0° C. to about 150° C.

11. The method of claim 1, wherein the polycarbosilane comprises a main chain of the following formula:

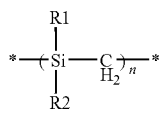

wherein R1 and R2 comprise, independently of one another, at least one of H, hydroxy, $C_1$-$C_4$ alkyl, $C_1$-$C_4$ alkoxy or phenyl; and n comprises an integer between 1 and 30.

12. The method of claim 1, wherein heating comprises heating at a temperature of about 300° C. to about 1500° C.

13. The method of claim 1, wherein heating comprises heating under air comprising oxygen gas.

14. The method of claim 1, wherein a size of the fiber is about 1 mm or less.

15. The method of claim 1, wherein the solution and the polycarbosilane melt are applied to the carbon fiber at different times.

16. The method of claim 1, wherein the metal oxide phase on the surface of the fiber is mesoporous.

17. A method comprising:
    applying a solution to a carbon fiber, wherein the solution comprises at least one metal oxide;
    drying the carbon fiber to fix the metal oxide on a surface of the carbon fiber;
    applying a polycarbosilane melt to the carbon fiber; and
    heating the carbon fiber to obtain a fiber comprising silica and metal oxide.

18. The method of claim 17, wherein the carbon fiber has a diameter of about 1 mm or less.

19. The method of claim 18, wherein the carbon fiber has a specific surface area of about 200 $m^2$/g to about 3000 $m^2$/g.

20. The method of claim 17, wherein the fiber comprises a crystalline metal oxide.

21. The method of claim 17, wherein the heating is performed in the presence of oxygen.

22. The method of claim 17, wherein the heating is performed at conditions effective to oxidize at least a portion of carbon in the carbon fiber.

23. The method of claim 17, wherein the metal oxide in the fiber has photocatalytic activity.

24. The method of claim 17, further comprising disposing the carbon fiber in a fabric.

25. The method of claim 17, further comprising disposing the fiber in a fabric.

26. The method of claim 17, wherein the metal oxide is titanium dioxide.

27. The method of claim 17, wherein the polycarbosilane comprises a main chain of the following formula:

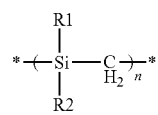

wherein R1 and R2 comprise, independently of one another, at least one of H, hydroxy, $C_1$-$C_4$ alkyl, $C_1$-$C_4$ alkoxy or phenyl; and n comprises an integer between 1 and 30.

* * * * *

UNITED STATES PATENT AND TRADEMARK OFFICE
CERTIFICATE OF CORRECTION

PATENT NO. : 8,137,748 B2
APPLICATION NO. : 12/199748
DATED : March 20, 2012
INVENTOR(S) : Lee It is certified that error appears in the above-identified patent and that said Letters Patent is hereby corrected as shown below:

On the Face Page, in Field (56), under "OTHER PUBLICATIONS", in Column 2, Line 1, delete "Graident" and insert -- Gradient --, therefor.

In Column 4, Line 30, delete "1500'." and insert -- 1500° C. --, therefor.

Signed and Sealed this
Twelfth Day of June, 2012

David J. Kappos
*Director of the United States Patent and Trademark Office*